DIGITAL-TO-ANALOG CONVERTER

Filed Jan. 4, 1965 Sheet 1 of 2

INVENTORS
ALBERT Z. KASZYNSKI
ROBERT E. PHELPS
BY Thomas J. Nikolai
ATTORNEY

United States Patent Office 3,422,423
Patented Jan. 14, 1969

3,422,423

DIGITAL-TO-ANALOG CONVERTER

Albert Z. Kaszynski, St. Paul, and Robert E. Phelps, White Bear, Minn., assignors to Sperry Rand Corporation, New York, N.Y., a corporation of Delaware Filed Jan. 4, 1965, Ser. No. 423,135
U.S. Cl. 340—347 2 Claims
Int. Cl. H03k 13/02

ABSTRACT OF THE DISCLOSURE

This invention relates to circuitry for converting information represented by digital signals into an analog representation, and more specifically to apparatus for converting a digital number into a recirculating square wave pulse, said pulse having a duty cycle representing the analog equivalent of the digital number. The square wave pulse is further utilized to control low-pass filter circuitry for producing an analog signal representative of the digital number.

*Summary of the invention*

The present invention provides a means for converting a digital number represented by a plurality of individual binary digits in parallel form to a single square wave signal having a characteristic which represents the value of the digital number. More specifically, the digital number to be converted to analog form is first entered into a storage register, the output from each stage of which is connected to a first set of inputs of a binary comparator circuit. A binary counter is also provided and the output from the counter stages are connected to a second set of inputs of the comparator. The counter is adapted to be advanced at a predetermined fixed rate by a suitable clock circuit. Means are provided which are responsive to the output from the comparator for producing a signal proportional to the time elapsing between the time that the counter is at a predetermined reference value and the time at which the count in the counter becomes equal to the binary representation in the storage register. Further means are then employed for converting this output signal to an analog voltage level.

Accordingly it is a primary object of the present invention to provide a digital-to-analog converter which is simple in design, and economical from the standpoint of the number of components needed for implementing the device.

Another object of the invention is to provide a digital-to-analog converter which has no moving parts.

Still another object of the invention is to provide means for converting a stored digital number into a recirculating square wave pulse, the duty cycle of which is proportional to the stored number.

Still another object of the invention is to provide a means for converting a square wave signal of varying duty cycle into a voltage level proportional to said duty cycle.

Other objects and features of the present invention will become more apparent from the following specific description of the embodiments of the present invention taken in conjunction with the figures in which:

*Description of the figures*

Referring now to FIG. 1, there is shown a N-bit digital number register 10 which is comprised of a plurality of interconnected bistable stages identified by the digit order indications $2^0$ through $2^N$. The register 10 is adapted to be loaded with information from an external source (not shown) over the cable 12. The external source may be any digital input device such as a computer or other suitable digital signal transmitting device. Each stage of register 10 provides an output on the lines 14 which connect (in a manner to be described more fully hereinbelow) to a first set of inputs of a binary comparator device 16.

The signals which appear on the output lines 14 are binary in nature. That is, the signals which appear on line 14 can have only two values representing the binary digits "0" and "1."

Figure 1:
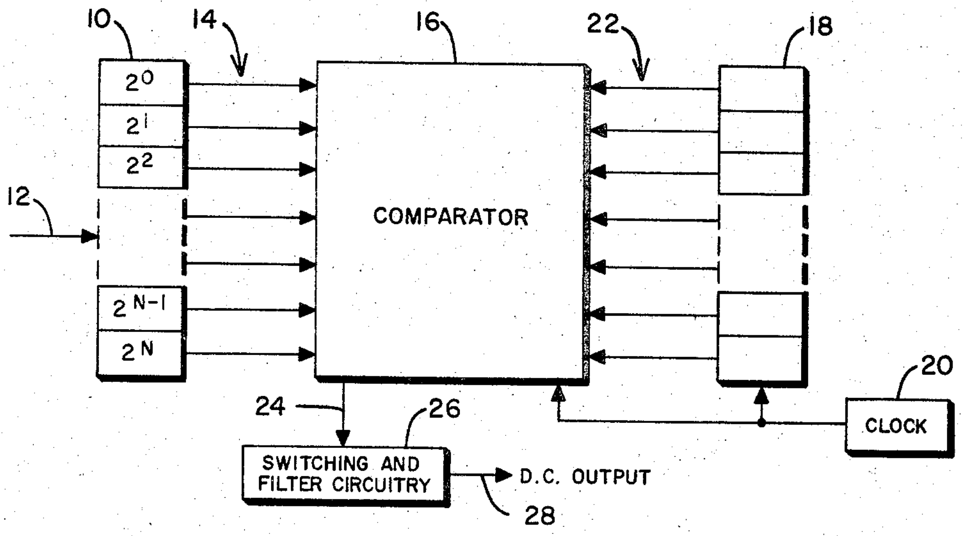
FIG. 1 is a block diagram describing a network for converting a stored parallel digital number into an equivalent analog voltage level.

Also included in the system of FIG. 1 is a serial counter 18 which preferably is comprised of a number of interconnected bistables stages identical in number to the number of stages in the data register 10. A source of timing pulses such as clock circuit 20 provides count advance pulses to the counter 18 for advancing the count contained in the counter at a fixed and predetermined rate. Each stage of counter 18 is connected by means of an output line 22 to a second set of inputs of the binary comparator device 16. Like the signals appearing on lines 14, the signals appearing on the lines 22 are binary in nature, i.e., are bivalued to represent the binary digits "0" and "1."

The comparator 16 functions to provide an output signal on line 24 at the instant at which the value contained in the counter 18 becomes equal to the binary numbers stored in the data register 10. It can be seen that the time elapsing between the instant that the counter is a a predetermined value and the instant at which the counter contains a value equal to the number contained in the data register is proportional to the value contained in the data register. Hence, the duty cycle of the signal appearing on line 24 is proportional to the value stored in the data register 10.

The comparator outputs appearing on line 24 is applied to suitable switching and filter circuits identified in FIG. 1 by block 26. The function of circuits 26 are to convert the varying duty cycle input signal to an analog voltage level such that the output appearing at terminal 28 is proportional in amplitude to the binary information stored in the data register 10.

Figure 2:
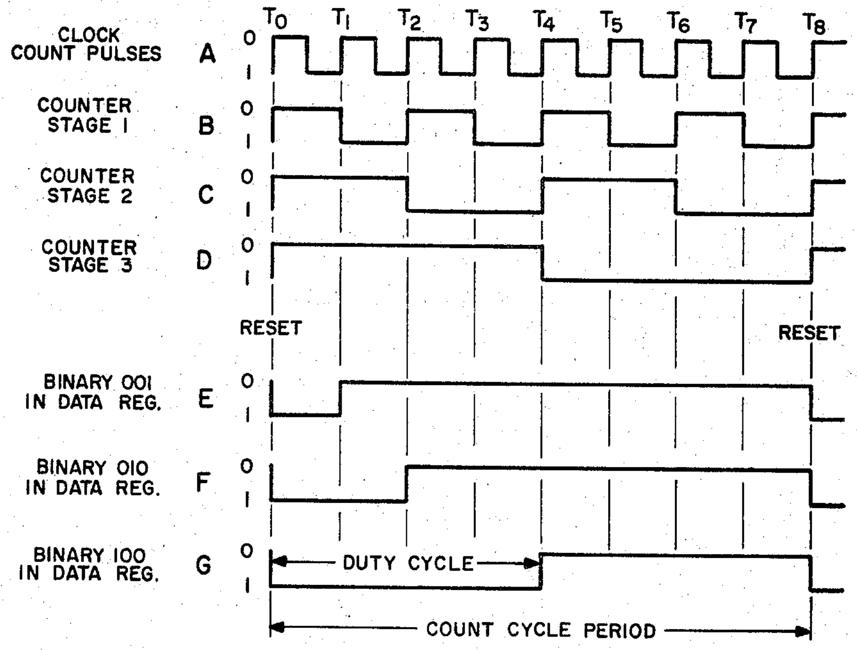
FIG. 2 depicts various pulse waveforms illustrating the operation of the system shown in FIG. 1.

Referring to FIGURE 2 there are illustrated typical waveforms of the signals appearing at various times in the system of FIGURE 1 and which, when analyzed, aid in the understanding of the operation of the system. The waveforms of FIGURE 2 are based upon a system having a three-stage data register and a three-stage serial counter. It is to be understood, however, that the number of stages employed in the data register and the counter are a matter of choice and no limitation is to be inferred to a system utilizing only three digit binary numbers.

FIGURE 2A illustrates the output from the clock circuit 20. As can be seen from this diagram, a binary "0" signal is represented by the more positive of two voltages. The binary "1" signal is represented by the more negative of the two voltage levels. With the data register 10 and the counter 18 having only three stages, the count cycle period, i.e., the time required to cycle the counter through each of its possible settings, includes eight clock pulse periods, That is, in order to advance the counter from its cleared condition through all of its possible settings back to the cleared condition requires the application of eight clock pulses. The waveforms of FIGURES 2B, C and D illustrate the output signals appearing on the counter output lines for stages 1, 2, and 3 at various times during the count cycle. At time $T_0$, i.e., before the application of the first clock pulse to the counter, each stage of the counter is in its cleared condition and contains a binary "0" signal. At time $T_1$ when the first clock signal is applied to the lowest-order stage of counter 18, the output appearing on the output line 22 associated with the lowest-order stage switches from a "0" representing level to a "1" representing level as indicated by the waveform of FIGURE 2B. The remaining stages (stages 2 and 3) remain at their "0" representing level. At time $T_2$, the second clock pulse signal is applied to the counter and the output from stage 1 again reverts to its "0" representing level and the output from stage 2 switches to its "1" representing level.

Table I illustrates the binary value in each of the three stages at the times $T_0$ through $T_7$.

TABLE I.—STAGES

| Time | $2^2$ | $2^1$ | $2^0$ |
|---|---|---|---|
| $T_0$ | 0 | 0 | 0 |
| $T_1$ | 0 | 0 | 1 |
| $T_2$ | 0 | 1 | 0 |
| $T_3$ | 0 | 1 | 1 |
| $T_4$ | 1 | 0 | 0 |
| $T_5$ | 1 | 0 | 1 |
| $T_6$ | 1 | 1 | 0 |
| $T_7$ | 1 | 1 | 1 |

From this table it can be seen that the application of timing pulses from the clock 20 causes the three-stage counter to be advanced through all of its possible values at a fixed and predetermined rate determined by the frequency of the output from the clock 20.

The waveforms of FIGURES 2E through 2G illustrate the manner in which the duty cycle of the output from the comparator 16 varies depending upon the information content previously stored in the data register 10. More specifically, FIGURE 2E illustrates the output appearing on line 24 during the count cycle period when binary 001 (decimal 1) is initially stored in the data register. It can be seen that the application of the first clock input signal at time $T_1$ advances the counter 18 to a value which is equal to the value assumed to be in the data register 10. Hence, at time $T_1$ the comparator 16 produces an output signal upon line 24 which switches from a "1" representing level to a "0" representing level. Because during the remaining portion of the count cycle period the equality condition no longer prevails there is no further signal produced on the output line 24 to revert the signal to the "1" representing level. It is not until the next count cycle period that the equality condition can again prevail to switch the output back to the "1" representing level.

FIGURE 2F illustrates the output one line 24 when it is assumed that the binary value 010 (decimal 2) is stored in the data register. It can be seen that it takes two clock pulse periods before the count in the counter 18 is advanced to a value where it is equal to the information stored in the data register 10. Accordingly, the output signal appearing on line 24 remains at its "1" representing level for a corresponding longer period of time than illustrated in the waveform of FIGURE 2E when it was assumed that binary 001 was contained in the data register. Similarly, the waveform of FIGURE 2G illustrates the output one line 24 when the binary value 100 (decimal 4) is stored in the data register. It can be seen that four complete clock cycles are required to bring the counter value into equality with the assumed contents of the data register and, accordingly, the duty cycle of the output waveform appearing on line 24 is correspondingly longer.

As will be explained more fully hereinbelow, means are provided for converting this varying duty cycle into an analog voltage level. Because the duty cycle is directly proportional to the binary value initially stored in the data register, it becomes immediately apparent that the analog output signal will also be proportional to the binary data stored in the data register.

Figure 3:
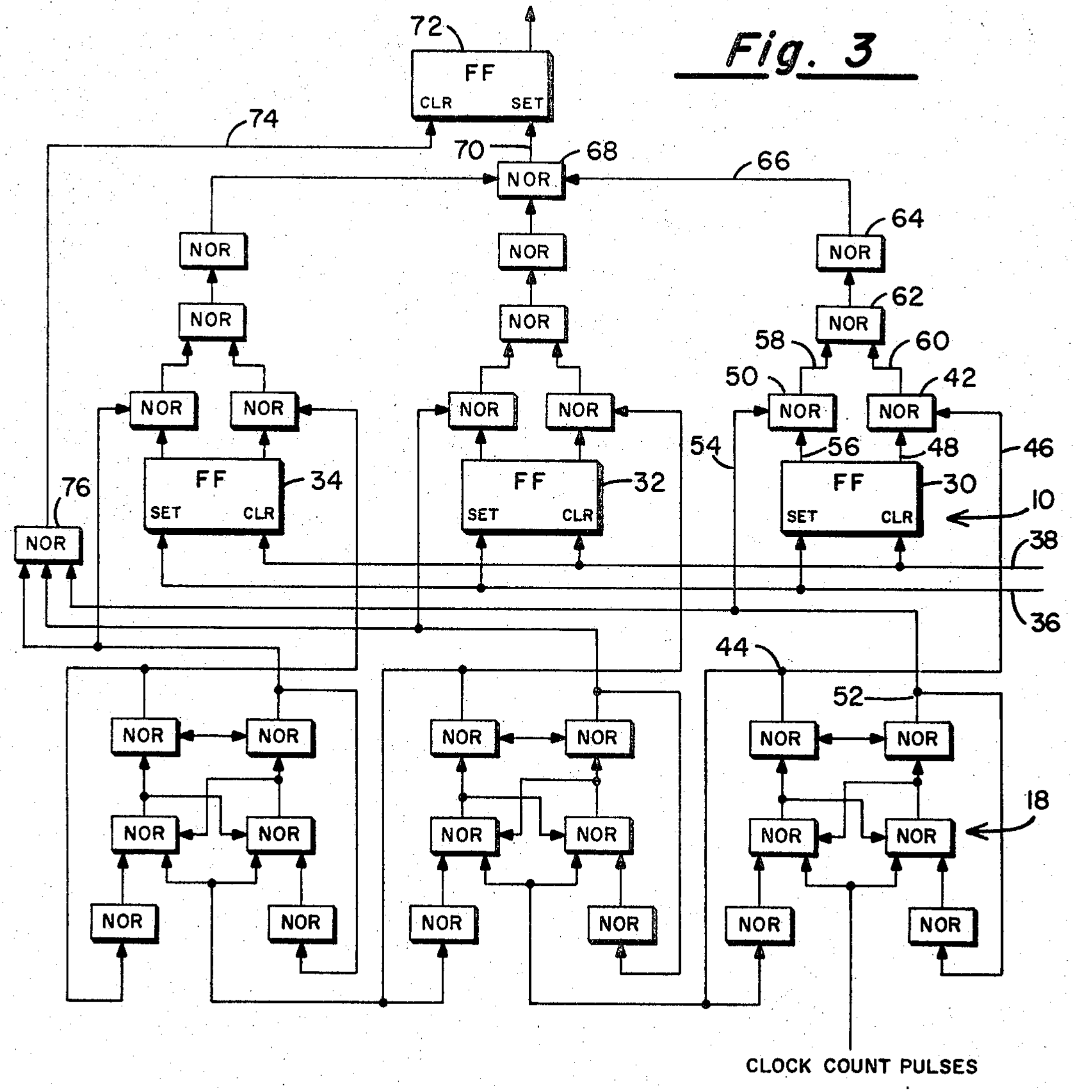
FIG. 3 is a logic diagram showing the circuits for implementing the system of FIG. 1.

Referring now to FIGURE 3, there is shown by means of a logical block diagram the circuitry for implementing the counter, the data register and the comparator illustrated in general in the system diagram of FIGURE 1.

The counter register indicated generally by numeral 18 is identical in construction to that described in the Osborne Patent 3,139,540, which issued June 30, 1964, and which is assigned to the assignee of the present invention. Because the construction and operation of the counter is fully described in the aforementioned Osborne patent, it is felt to be unnecessary to describe in detail this feature of the present invention. However, it should be emphasized that any suitable binary counter can be employed in the system and that there is no intention to limit the invention to a system employing the particular type of counter described in the Osborne patent. Also, while the logic diagram of FIGURE 3 illustrates an embodiment for a register comprised of only three stages, it is to be understood that it would be a simple matter to extend the system to a larger number of stages by following the teachings of the present invention.

The data register indicated generally by the numeral 10 is comprised of a plurality of bistable stages or flip-flops 30, 32 and 34 with means (not shown) for entering information thereon by way of the SET input lines and the CLEAR input lines 38. The manner in which data can be entered into a register of the type described is felt to be well known to those possessing ordinary skill in the data processing arts.

In the preferred embodiment of the present invention the comparator is made up of a plurality of NOR circuits. The logical operation of the NOR circuits in this invention can be stated by the well-known rule that if any input to a NOR circuit is a "1" the output will be a "0," and only if all inputs are "0's" will the output be a "1."

It can be seen from FIGURE 3 that the comparator receives inputs from both the individual counter stages and the individual data registers stages. More specifically, a first input to NOR circuit 42 comes from the SET terminal 44 of the lowest-order stage of the counter by way of conductor 46 while a second input to NOR circuit 42 comes from the SET side of the lowest-order register stage 30 by way of conductor 48. In a related manner, NOR circuit 50 receives a first input signal from the CLEAR terminal 52 of the lowest-order counter stage by way of conductor 54 and a second input from the CLEAR side of the flip-flop 30 by way of conductor 56. NOR circuits 42 and 50 each provide an output on the lines 58 and 60 which are connected as inputs to the NOR circuit 62. NOR circuit 62 provides an output which is inverted by the NOR circuit 64, and this inverted output is, in turn, connected by way of conductor 66 to a compare gate which includes NOR circuit 68.

The structure associated with the remaining higher-ordered counter and register stages is identical to that described in connection with the lowest-order stage and it is felt unnecessary to specifically recite each interconnection since one skilled in the art can immediately understand the operation of the remaining two stages of comparison after having read the detailed explanation of the operation of the comparator stages for the lowest-order digit position.

For the purposes of illustrating the operation of the system, assume that a binary "1" signal is stored in flip-flop 30 and that the lowest-order stage of counter 18 is set to its "0" state, i.e., the information in the counter does not compare with the information in the data register 10. With this condition prevailing, the signals appearing on conductors 48 and 56 are a logical "1" and a logical "0" signal respectively. Similarly, the output signals appearing at junctions 44 and 52 and applied to the second input terminals of NOR circuits 42 and 50 will be a logical "1" and a logical "0" respectively. Hence, it can be seen that NOR circuit 50 will be fully enabled (each input has a "0" applied to it) and will output a logical "1" signal on conductor 58. With logical "1" signals applied to the NOR circuit 42, it will output a logical "0" signal on conductor 60. Since all of the inputs to NOR circuits 62 are not simultaneously at the "0" level it will output a logical "0" signal to the NOR circuit 64 such that a "1" signal appears on conductor 66. This logical "1" signal when applied to NOR circuit 68 prevents NOR circuit 68 from producing a logical "1" output which signifies an equality comparison.

Next, assume that the lowest-order stage of counter 18 is toggled to its "1" state and that register stage 30 stores a logical "1" signal. With this assumption prevailing, the signals appearing on conductors 46, 48, 54 and 56 will be 0, 1, 1, and 0, respectively. Hence, neither circuit 42 nor circuit 50 will be fully enabled and each will output a logical "0" signal on conductors 58 and 60. NOR circuit 62 will now be fully enabled and will output a logical "1" signal to NOR circuit 64. The signal appearing on conductor 66 and applied as a first input to NOR circuit 68 will be a "0" signal. Provided that the information contained in stages 32 and 34 of the data register 10 are identical to the digits stored in stages $2^1$ and $2^2$ of the counter register 18, all of the inputs to NOR circuit 68 will be logical "0" signals and circuit 68 will provide a logical "1" output on conductor 70. As was mentioned previously a logical "1" output signal from NOR circuit 68 is indicative of the fact that the information contained in the data register 10 corresponds digit-for-digit with the information contained in corresponding stages of the counter register 18. This logical "1" output signal on line 70 is used to set the Count Control flip-flop 72 to its "1" state.

The Count Control flip-flop 72 will remain in this SET condition until it is reset to its "0" state by the application of a logical "1" input signal to the CLEAR terminal thereof over conductor 74. It can be seen that a "1" signal will appear on conductor 74 only when NOR circuits 76 is fully enabled, i.e., at the time when each of the inputs thereto are simultaneously at the logical "0" level. The inputs to NOR circuit 76 come from the CLEAR side of each stage of the counter register 18. Hence, it is only when the counter is completely cleared that NOR circuits 76 is fully enabled.

To summarize the operation of the circuits of FIGURE 3, at the beginning of the digital-to-analog conversion, the reset gates 76 would be enabled because the counter 18 would be in a cleared condition. This causes a "1" signal to appear on conductor 74 setting the Count Control flip-flop 72 to a "1" representing signal level. This signal level will be maintained during the time interval that the counter is advancing in response to the application of the input clock pulses. Once the contents of all the counter stage flip-flops coincides with the contents of the corresponding flip-flops in the data register 10, the compare gate 68 will be enabled producing a "1" representing level to set the Count Control flip-flop 72, the output of which now assumes a "0" representing level for the duration of the count cycle. The Count Control flip-flop 72 is then reset to a "1" when the counter assumes a condition wherein all the digits are "0" and the waveform (the duration of which represents the binary number stored in the register 10) will be recirculated during each subsequent time cycle.

Figure 4:
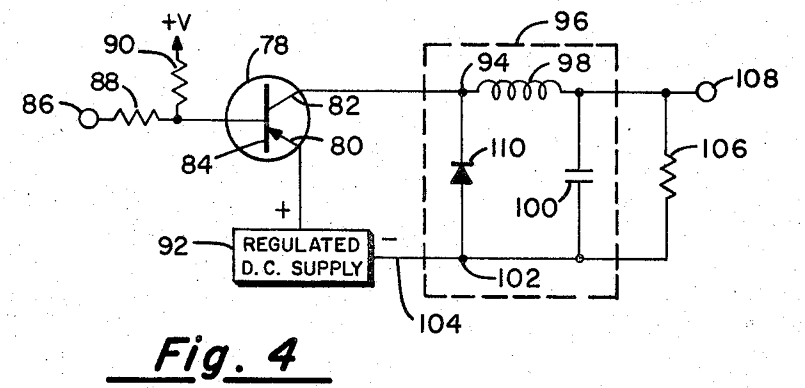
FIG. 4 is an electrical schematic diagram of the circuit used to convert an input pulse of variable duty cycles into an analog voltage level proportional to the duty cycle of the input signals.

In FIGURE 4 is illustrated the electrical circuit for converting the variable duty cycle square wave pulse output from the Count Control flip-flop 72 of FIGURE 3 into a voltage amplitude proportional to said duty cycle, which, in turn, is the analog equivalent of the binary number contained in the data register 10.

The circuit comprises a current switching means, such as PNP transistor 78 having an input electrode 80 an output electrode 82 and a control electrode 84. An input terminal 86 is connected to the control or base electrode by means of a resistor 88. The junction between the resistor 88 and control electrode 84 is connected by a resistor 90 to a source of positive bias voltage +V. The bias normally maintains the transistor switching element in its nonconductive state, such that a relatively high impedance is present between the input electrode (emitter) 80 and the output electrode (collector) 82. The input electrode is connected to the positive terminal of a regulated direct current power supply 92. The output electrode 82 is connected to a first input terminal 94 of a low pass filter network 96 which includes a series inductor 98 and a shunt capacitor 100. The other input terminal 102 of the filter network 96 is connected by conductor 104 to the negative terminal of the power supply 92. A load resistor 106 is connected across the output of the filter network and the analog output signal is taken at the terminal 108. A diode 110 is connected between the filter input terminals 94 and 102, the cathode electrode of said diode being connected to the terminal 94. This diode serves to protect the transistor from large inductive voltage surges which may result when the current flowing through the inductor 98 is cut off.

In operator, the output of the Count Control flip-flop 72 of FIGURE 3 is connected to the input terminal 86 of the circuit of FIGURE 4. When the flip-flop is cleared, its output on terminal 86 is relatively positive and, hence, the bias applied to the control electrode 84 of transistor 78 by way of the voltage divider formed by resistors 88 and 90 maintains the transistor nonconducting, thereby preventing current from flowing from the power supply 92 to the low pass filter 96 and load 106. At the time that the comparator detects equality between the contents of the data register and counter and produces the "compare" signal for setting the County Control flip-flop 72 the input signal at terminal 86 goes sufficiently negative to overcome the positive bias on the control electrode 84 of transistor 78. The transistor is switched to its low-impedance state which permits current to flow from the power supply 92 to the load 106. The low pass filters network 96 acts as an integrating circuit such that output voltage developed across the load resistor is the average value of input to the filter network. Because the average value of the direct current from the power supply 92 is a function of the duty cycle of the switching pulses applied to the input terminal 86, the output at terminal 108 is proportional to this duty cycle.

In an actual embodiment of the digital-to-analog converter described herein, a regulated power supply of 15 volts was used with a five stage data register and a five stage counter. The measured output voltage at terminal 108 was made to vary between 0 volt and 15 volts in 32 increments of approximately 0.5 volt each. In other words, a change in amplitude of approximately 0.5 volt uniquely identified each of the 32 possible combinations of five binary digits. This embodiment performed with an accuracy of ±100 millivolts. The clock used to advance the counter had a pulse repetition rate of two pulses per microsecond and after receiving a change in the contents of the data register, about 10 count cycles were required for the output to reach a steady state analog voltage value. This gives a system recovery time of approximately 1 millisecond.

It is to be understood that the above described arrangements are illustrative of the application of the principles of the invention. Numerous other arrangements may be devised by those skilled in the art without departing from the spirit and scope of the invention as set forth in the following claims.

What is claimed is:

1. A digital-to-analog converter, comprising:

(a) a storage register adapted to store information represented by digital signals which is to be converted to a analog signal representation;

(b) a source of timing signals;

(c) a binary counter connected to receive said timing signals such that said counter is advanced at a fixed rate;

(d) comparing means connected to receive the output from said storage register and said binary counter for producing an output signal only when the output from said counter becomes equal to said information stored in said register;

(e) and means responsive to the output from said comparing means for producing a voltage level proportional to the time elapsed from the time said counter is at a predetermined setting until said comparing means output signal is produced.

2. A digital-to-analog convertor, comprising:

(a) a storage register adapted to store information represented by digital signals which are to be converted to an analog signal representation;

(b) a source of timing signals;

(c) a binary counter connected to receive said timing signals such that said counter is advanced at a fixed rate;

(d) comparing means connected to receive the output from the said storage register and said binary counter for producing an output pulse signal only when the output from said counter becomes equal to said information stored in said register;

(e) a bistable circuit adapted to be switched from a first to a second state by the output pulse from said comparing means only at the instant that the value represented by said digital signals in said storage register becomes identical in value to the digital signals in said binary counter; and (f) means connected to said counter for switching said bistable circuit from said second state to said first state when said counter contains a predetermined value.

References Cited

UNITED STATES PATENTS

| | | | |
|---|---|---|---|
| 2,907,021 | 9/1959 | Woods | 340—347 |
| 3,101,406 | 8/1963 | Englemann | 328—127 |
| 3,267,429 | 8/1966 | Strohmeyer | 340—347 |
| 3,092,808 | 6/1963 | Wychorski et al. | 340—146.2 |

MAYNARD R. WILBUR, *Primary Examiner.*

J. GLASSMAN, *Assistant Examiner.*